(12) United States Patent
Schäflein et al.

(10) Patent No.: US 9,318,929 B2
(45) Date of Patent: Apr. 19, 2016

(54) ELECTRIC MACHINE HAVING A POWER CONNECTION UNIT

(75) Inventors: Alexander Schäflein, Schweinfurt (DE); Matthias Weidner, Wasserlosen (DE); Udo Niehaus, Schonungen (DE); Matthias Cudok, Ritschenhausen (DE); Christian Brückner, Rimpar (DE); Stefan Keller, Sennfeld (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 542 days.

(21) Appl. No.: 13/477,224

(22) Filed: May 22, 2012

(65) Prior Publication Data

US 2012/0313460 A1    Dec. 13, 2012

(30) Foreign Application Priority Data

Jun. 9, 2011   (DE) .................. 10 2011 077 294

(51) Int. Cl.
*H02K 3/38* (2006.01)
*H02K 5/22* (2006.01)

(52) U.S. Cl.
CPC . *H02K 5/225* (2013.01); *H02K 3/38* (2013.01)

(58) Field of Classification Search
CPC ................. H02K 3/38; H02K 5/225
USPC .................... 310/43, 67 R, 68 R, 71
IPC ......................................................... H02K 3/38
See application file for complete search history.

(56) References Cited

U.S. PATENT DOCUMENTS

| | | | |
|---|---|---|---|
| 8,183,728 B2* | 5/2012 | Schaflein ............... | H02K 3/522 310/71 |
| 2002/0109422 A1* | 8/2002 | Hatton ........................ | 310/67 R |
| 2005/0280320 A1* | 12/2005 | Utsumi ................ | G01D 5/2046 310/43 |
| 2007/0145839 A1* | 6/2007 | Kimura ................ | H02K 19/103 310/68 B |
| 2007/0236849 A1* | 10/2007 | Bono et al. ..................... | 361/104 |
| 2007/0278876 A1* | 12/2007 | Haga ..................... | H02K 3/325 310/71 |
| 2010/0156208 A1* | 6/2010 | Schaflein ............... | H02K 3/522 310/71 |
| 2010/0187923 A1* | 7/2010 | Migita ................... | H02K 3/522 310/71 |
| 2012/0112582 A1* | 5/2012 | Kim ..................... | B62D 5/0403 310/71 |
| 2012/0313460 A1* | 12/2012 | Schaflein et al. ............... | 310/43 |

FOREIGN PATENT DOCUMENTS

EP    2139094 A1    12/2009

OTHER PUBLICATIONS

United Nations, "Uniform Provisions Concerning the Approval of Mechanical Coupling Components of Combinations of Vehicles", Dec. 7, 2001.*

* cited by examiner

*Primary Examiner* — John K Kim
(74) *Attorney, Agent, or Firm* — Cozen O'Connor

(57) ABSTRACT

An electric machine has a stator which carries a polyphase coil winding, wherein coil ends are connected in a predetermined manner to a plurality of electric connection conductors. The electric machine comprises a power connection unit having a plurality of terminal conductors which are constructed separate from the connection conductors and which by a first end portion are bondingly connected or connectable to the connection conductors and by a second end portion are connected or connectable to the electrical energy source. The power connection unit is constructed as a plastic composite element, in which the terminal conductors are embedded at least over a portion of their length in a plastic shell so as to be spaced apart from one another, and wherein first end portions of the terminal conductors project out of the plastic shell.

10 Claims, 4 Drawing Sheets

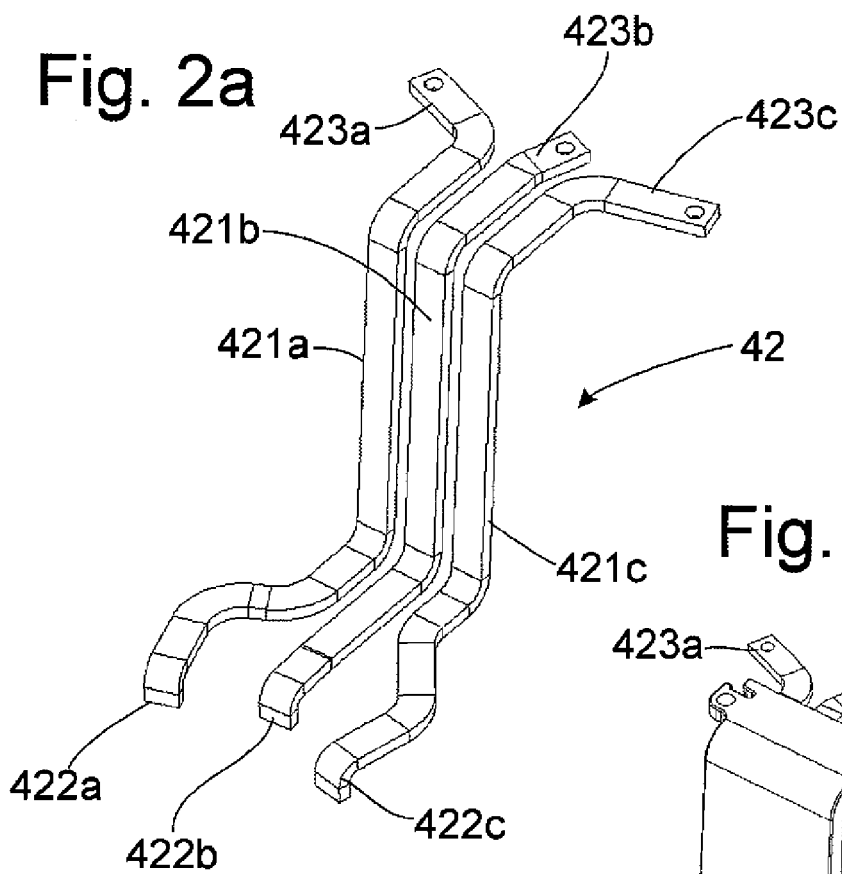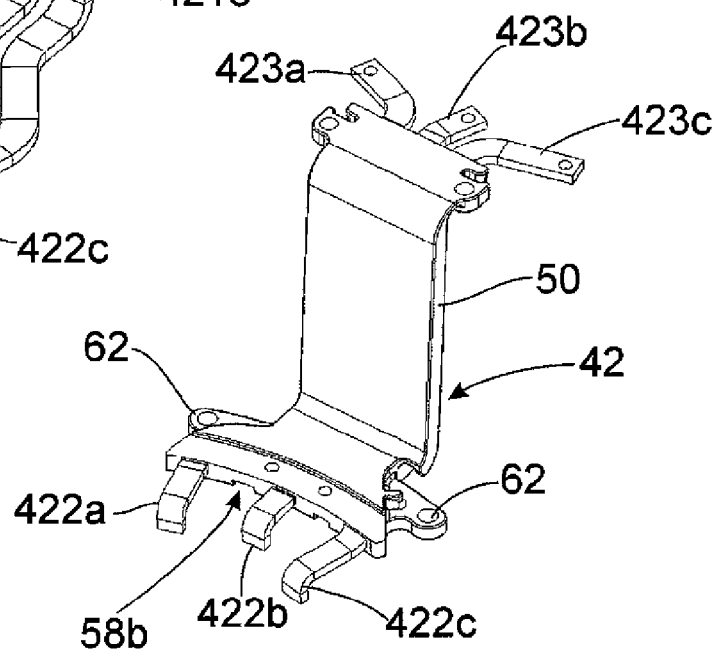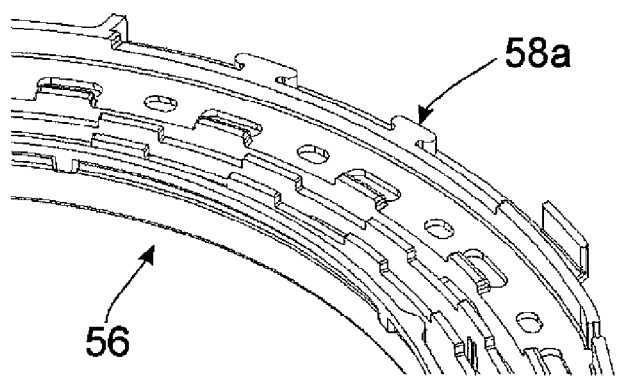

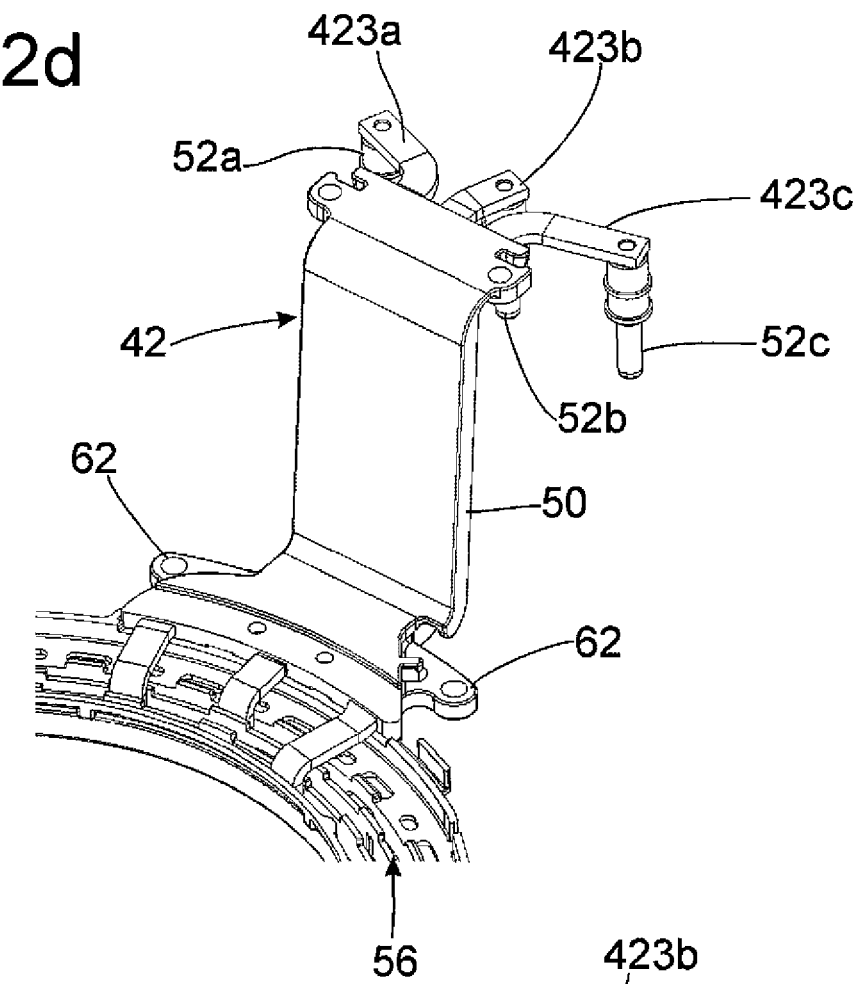
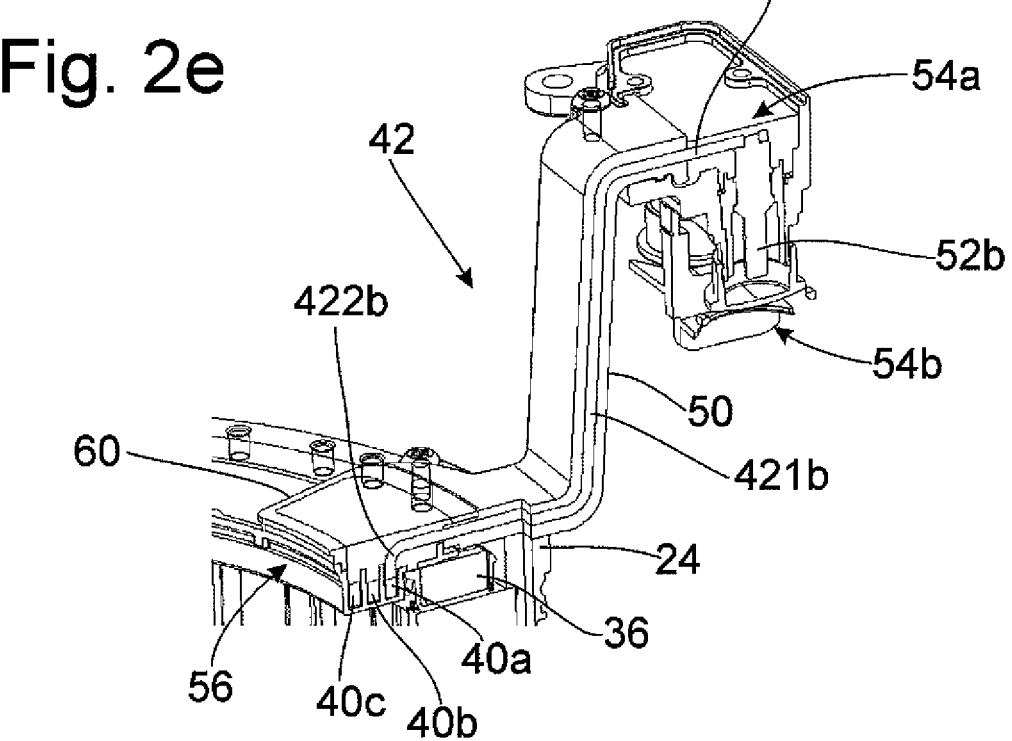

ELECTRIC MACHINE HAVING A POWER CONNECTION UNIT

BACKGROUND OF THE INVENTION

1. Field of the Invention

The present invention is directed to an electric machine having a power connection unit with a plurality of electric connection conductors.

2. Background of the Invention

A generic electric machine is already known from EP 2 139 094 A1. For connecting the stator winding to an electrical energy source, the terminal conductors of the power connection unit are inserted together with the annular connection conductors of the coil ends in a common tub-shaped plastic carrying part and are sealed in by means of a sealing material. There is a need for optimizing handling of this plastic carrying part with the conductor elements inserted therein.

On this basis, the present invention has the object of providing an electric machine of the type mentioned above having a power connection unit which is easier to handle.

SUMMARY OF THE INVENTION

Accordingly, the proposed electric machine is characterized in that the power connection unit is constructed as a plastic composite element in which the terminal conductors are embedded at least over a portion of their length in a plastic shell so as to be spaced apart from one another, and wherein first end portions of the terminal conductors project out of the plastic shell, which first end portions are provided for connecting to the annular connection conductors. This affords the advantage that during manufacture of the stator the connection conductors can first be arranged with the carrying element thereof at the stator and can be connected to the coil ends so that the entire circumference of the stator is fully available for this handling process and welding tools or soldering tools, for example, have better spatial access for the contact-making process. The power connection unit is provided as a separate structural component part, particularly as an injection-molded plastic composite element, which is not fastened to the stator until after the coil ends are connected. In so doing, the circumferential position of the power connection unit at the stator is freely selectable in principle. The connection of the terminal conductors to the connection conductors is carried out in each instance between two contacts of the coil ends with the connection conductors by means of welding, soldering or other suitable, preferably bonding, joining technique. Of course, the power connection unit can also be secured to the stator already before contact is made with the coil ends.

According to a first advantageous further embodiment, the power connection unit can be fastened or is fastened to a stator carrier of the stator by at least one fastening portion. In particular, a mutual positive connection which is possibly secured by a further connection such as, for example, a screw connection, rivet connection or adhesive connection, can be used for this purpose. In this way, the power connection unit can be securely positioned and fastened relative to the connection conductors which are likewise arranged at the stator carrier, particularly by means of a carrier element of insulating material, and the mutual connection area of the terminal conductors and connection conductors is constructed so as to be substantially free of forces.

An even better positioning of the respective parts relative to one another can be achieved in that the power connection unit can be arranged or is arranged at the carrier element by positive engagement, which can easily be realized by forming correspondingly shaped mutual engagement contours of the plastic parts.

To protect against external influences, particularly penetration of moisture, and to further reinforce the arrangement, the areas where the first end portions of the terminal conductors connect to the connection conductors at the stator can be covered by a common cap element or frame element which engages by positive engagement in the carrier element and plastic shell. The connection area formed in this way can be sealed or filled with a sealing material if necessary.

The connection of the stator winding can advantageously be carried out in that the second end portion of a terminal conductor has a contact element projecting therefrom which is enclosed by a first terminal housing area connected to the plastic shell. In so doing, a sleeve in particular can be provided as connection element, the electrical connection being produced via the end face thereof and/or via the inner circumferential surface thereof to another connection element external to the electric machine by axially joining together, e.g., by plugging in or screwing, the connection elements to be connected to one another.

Alternatively, according to another embodiment, a free space can be formed between the contact element and the first terminal housing area. In this case, a free-standing pin carrying current on the outer circumference and/or end face thereof can function as connection element. In this case also, the connection is produced mechanically by axially joining as was mentioned above.

It is further proposed that the power connection unit is formed with a second terminal housing area which can be inserted into the first terminal housing area, preferably in the assembly direction of the connection elements, so as to positively engage therewith or can enclose the latter in a positively engaging manner, wherein the two terminal housing areas are advantageously secured jointly to a machine housing enclosing the stator. Further, at least one sealing element which prevents splashed water from penetrating into the interior of the electric machine can be provided respectively between the first terminal housing area and second terminal housing area and also between one of the terminal housing areas and the machine housing.

In a further embodiment, the power connection unit has a signal connection area by means of which, for example, a pilot wire or a sensor can be connected to a control unit, particularly a temperature sensor or speed sensor, for controlling the electric machine.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention will be described by way of example in the following with reference to the accompanying drawings in which:

FIG. 2a is a perspective view of the terminal conductors of a power connection unit of a first embodiment of the present invention;

FIG. 2b is a perspective view of the terminal conductors of FIG. 1 covered by a plastic shell;

FIG. 2c is a partial perspective view of the carrier element of FIG. 1 of the present invention;

FIG. 2d is a view of the terminal conductors of the first embodiment of the present invention connected to the carrier element; and FIG. 2e is a perspective side view of the power connection unit of the first embodiment of the present invention;

DETAILED DESCRIPTION OF THE PRESENTLY PREFERRED EMBODIMENTS

Figure 1:
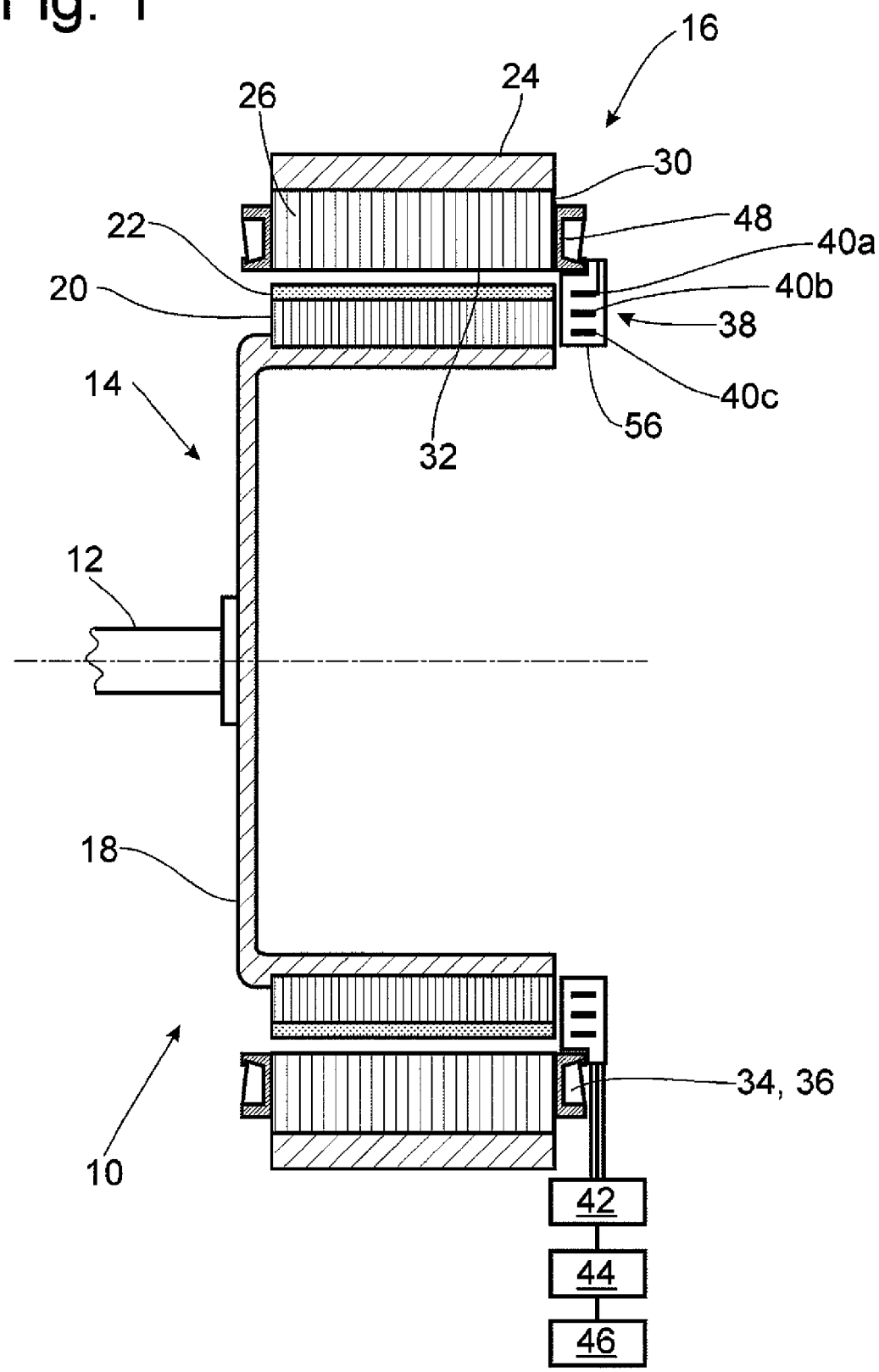
FIG. 1 is a schematic cross-sectional view of an internal rotor type electric machine in accordance with the present invention.

FIG. 1 schematically shows an electric machine 10, more precisely a permanently excited internal rotor type electric synchronous machine, having a rotor 14 which is rotatable around a rotor shaft 12 and having a stator 16 radially outwardly enclosing the latter. The rotor 14 comprises a pot-shaped rotor carrier 18 which is shaped from sheet steel, a laminated rotor core 20 having a plurality of permanent magnets 22 at a distance from one another being arranged on the cylindrical outer circumferential surface of the rotor carrier 18.

The stator 16 comprises an annular stator carrier 24 made of metal, for example, an aluminum or steel material, a circular laminated stator core 26 which is also formed of laminated plates being arranged in the cutout of the stator carrier 24. The stator carrier 24 can also be an outer housing or an intermediate housing of the electric machine 10. The laminated stator core 26, not shown in detail, can be constructed as an annular lamination stack or in a segmented manner and can be formed of a plurality of identical, preferably T-shaped, stator segments which are received and held together by the stator carrier 24.

The stator 16, or lamination stack 26 thereof, has a yoke area 30 and teeth 32 projecting therefrom; these teeth 32 are radially inwardly directed in the present case, are outfitted with individual coils 36 to form a polyphase winding 34, and are associated with individual electric strands. The ends of the individual coils 36 are connected in a predetermined manner by means of a connection arrangement 38, shown only schematically in FIG. 1, to a plurality of connection conductors 40a-c arranged coaxial to the stator 16 and are connected to an electrical energy source 46 via power electronics 44 by means of a power connection unit, designated generally by 42 in FIG. 1, so that a current of variable phase and amplitude can be applied to the winding 34 of the electric machine 10.

The connection conductors 40a-c are constructed as copper strip conductors and are preferably curved to form an open ring, the ends thereof being likewise preferably arranged in a circumferential area outside the power connection unit 42. In other words, the connection conductors 40a-c are constructed in a continuous manner in the region of the power connection unit 42. For the arrangement of the connection conductors 40a-c at the stator 16, these connection conductors 40a-c are received so as to be mutually insulated from one another by an annular carrier element 56 formed of plastic. In FIG. 1, the carrier element 56 is supported axially at insulating bodies or winding bodies 48 of the coils 36 and is also radially centered at the same time by the inner circumferential surface defined by the latter.

In the present embodiment, the coils 36 are connected in a delta connection. However, the type of connection is not significant as concerns the present invention, i.e., a star connection or other connection could also be implemented alternatively using another, fourth connection conductor.

Figure 3A:
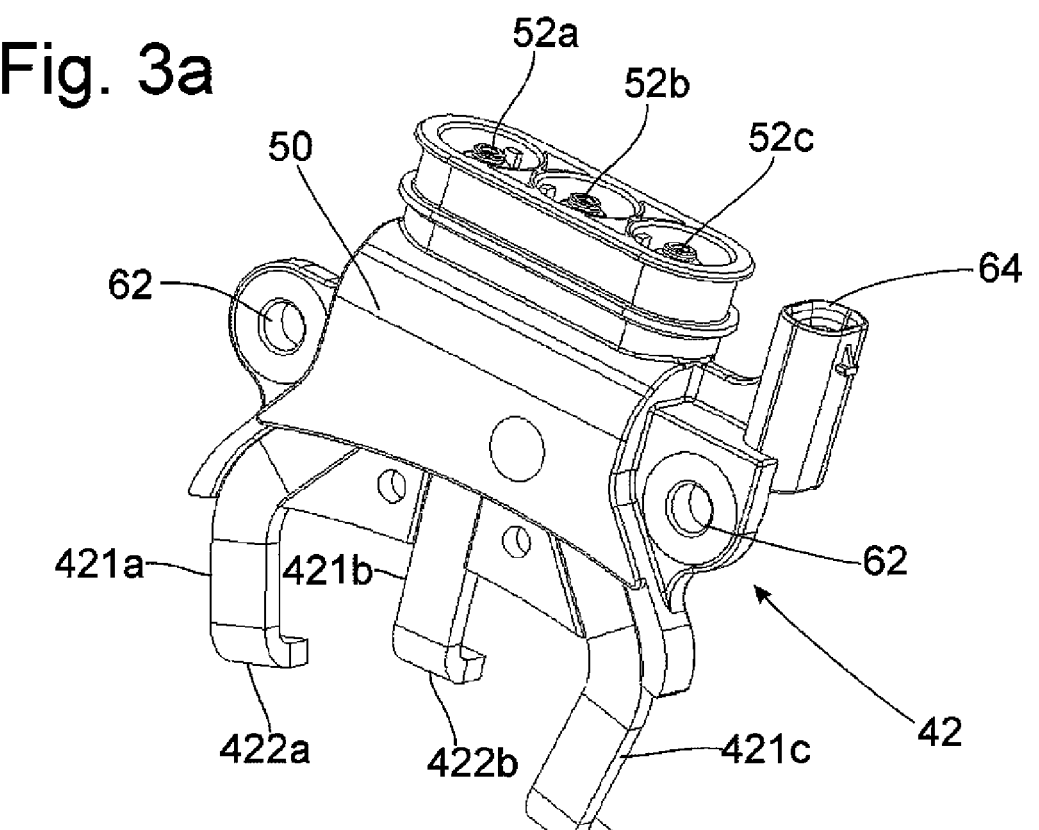
FIG. 3a is a perspective view of a second embodiment of the power connection unit of the present invention.

As was already stated, the electric machine 10 comprises a power connection unit, designated in all of the drawings by 42, for connecting to an electrical energy source. For this purpose, the power connection unit 42 has a plurality of terminal conductors 421a-c, three in the embodiments in FIGS. 2a-e, which are likewise fabricated from copper strip and constructed separately from the connection conductors 40a-c. The terminal conductors 421a-c are arranged so as to be spaced apart circumferentially, but in a common radial plane, at the stator. In particular, the terminal conductors 421a-c are bondingly connectable or connected by a first end portion 422a-c, via the cross-sectional surface thereof, by means of soldering or welding to the front sides of the connection conductors 40a-c, which are radially staggered at the stator, and are provided with a second end portion 423a-c above a terminal housing for connecting to the electrical energy source 46. It can be seen from FIGS. 2d,e that the terminal conductors extend axially initially by a relatively short portion from this connection area with respect to the axis of rotation of the electric machine and, after bending by 90° radially outward, extend beyond the maximum stator diameter. The continuation of the terminal conductors 421a-c is contingent upon the particulars of the case of application. According to FIGS. 2d,e, the terminal conductors 421a-c are bent twice more by approximately 90° in each instance to form an axially extending portion and a radially extending portion, the second end portions 423a-c being arranged at a distance from the main body of the stator 16. In FIG. 3, on the other hand, the terminal conductors 421a-c are comparatively short and are formed directly at the stator 16.

The power connection unit 42 is constructed overall as a separate structural component part as a plastic composite element, particularly as an injection molded plastic composite element, wherein the terminal conductors 421a-c, at least over a partial length thereof, are embedded at a distance from one another and completely in a plastic shell 50, and, further, the terminal conductors 421a-c project by first end portions 422a-c thereof out of the plastic shell 50. The plastic shell 50 and the carrier element 56 of the connection conductors 40a-c, which carrier element 56 is likewise fashioned from an insulating material, particularly plastic, have positive engagement profiles 58a, b which are designed for mutual engagement and by means of which the power connection unit 42 can be secured to the carrier element 56 by positive engagement. Further, a shared cap element or frame element 60 engages over the connection areas where the first end portions 422a-c of the terminal conductors are connected to the connection conductors 40a-c at the stator 16, which cap element or frame element 60 simultaneously engages, by means of positive engagement profiles provided thereon, in the carrier element 56 and plastic shell 50 of the power connection unit 42. Further, fastening portions 62 in the form of through-openings are provided in the plastic shell 50 to secure the power connection unit 42 to the stator carrier 24, e.g., by means of a screw connection, rivet connection or similar connection. For the rest, the carrier element 56 can be constructed particularly as described in EP 2 139 094 A1 which is incorporated herein by reference in its entirety.

The second end portions 423a-c of the terminal conductors 421a-c each have a contact element 52a-c projecting therefrom. The contact element 52a-c is constructed as a pin in FIG. 2 and as a sleeve in FIG. 3 and is bondingly secured to the end portions 423a-c by means of welding or soldering and possibly using a positive engagement. These contact elements 52a-c are enclosed by a first terminal housing area 54a which is arranged at the plastic shell 50 or constructed integral therewith; in FIG. 2, a free space is formed around the pin for making contact with the outer circumferential surface. Further, the power connection unit 42 has a second terminal housing area 54b which is connected or connectable by positive engagement to the first terminal housing area 54a and is inserted into or encloses the latter. This terminal housing area 54b can preferably be constructed as part of an electric plug-in connector. Accordingly, the two terminal housing areas 54a, b provide a common terminal housing which can be secured, e.g., to a machine housing which surrounds the stator 16 directly or at a radial distance therefrom, and a sealing element can be arranged between the terminal housing areas 54a, b for sealing the power connection unit 42.

As can be seen in the embodiment illustrated in FIGS. 2a-e, the terminal conductors 421a-c are secured by their first end portions 422a-c to the connection conductors 40a-c so as to be spaced apart in circumferential direction at the stator 16; this also applies to the second end portions 423a-c and, therefore, the contact elements 52a-c. An arrangement of this kind is likewise realized in the embodiment in FIG. 3a which corresponds to the embodiment described in FIGS. 2a-e with respect to its basic construction. Further, at the plastic shell 50 or at the terminal housing 54a which in this instance is fashioned integral with the plastic shell 50, the power connection unit 42 has a signal connection area 64 by which a sensor can be connected to the stator 16 for controlling the electric machine.

Figure 3B:
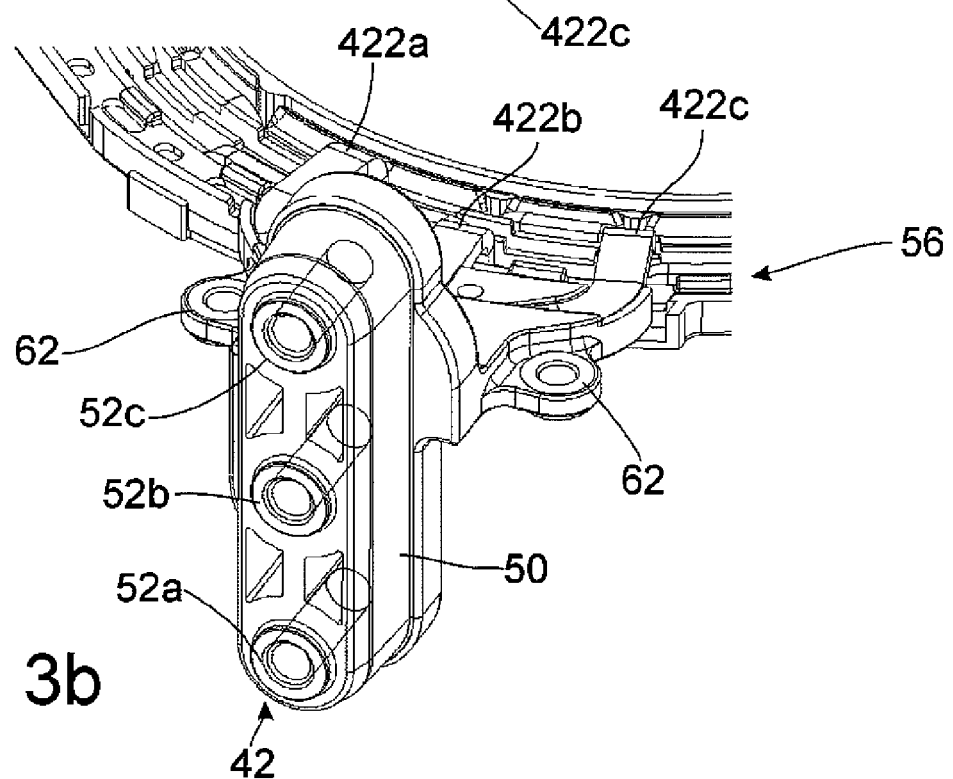
FIG. 3b is a perspective section view of the power connection unit of the second embodiment of the present invention.

In the embodiment shown in FIG. 3b which is modified from the arrangement described above, the terminal conductors are merely secured to the connection conductors by their first end portions 422a-c so as to be spaced apart in circumferential direction at the stator 16, while the contact elements 52a-c can be arranged so as to be spaced apart axially at the stator 16 by means of correspondingly twisted or curved terminal conductors which are hidden by the plastic shell 50 in FIG. 3b.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. An electric machine comprising:
 a plurality of electric connection conductors (40a-c);
 a stator (16) having a polyphase coil winding (34) with coil ends, said coil ends connected in a predetermined manner to said plurality of electric connection conductors (40a-c); and
 an injection molded plastic composite power connection unit (42) for connection to an electrical energy source (46), said injection molded plastic composite power connection unit (42) having:
  a plurality of first end portions (422a-c) bondingly connected or connectable to said connection conductors (40a-c),
  a plurality of second end portions (423a-c) connected or connectable to the electrical energy source (46), and
  a plurality of terminal conductors (421a-c), each of the plurality of terminal conductors (421a-c) connecting a respective first end portion to a respective second end portion;
 said injection molded plastic composite power connection unit (42) being constructed such that said terminal conductors (421a-c) are overmolded with plastic and completely embedded in said plastic in a plastic shell (50) so as to be spaced apart from one another,
 wherein at least a portion of each of said first end portions (422a-c) and said second end portions (423a-c) are not encapsulated by said plastic shell.

2. The electric machine according to claim 1, wherein said injection molded plastic composite power connection unit (42) additionally comprises at least one fastening portion (62) and said stator (16) comprises a stator carrier (24); and wherein said injection molded plastic composite power connection unit (42) is securable to said stator carrier by said at least one fastening portion (62).

3. The electric machine according to claim 1, additionally comprising a carrier element (56) made of insulating material; said connection conductors (40a-c) arranged at said stator (16) by said carrier element (56); and said injection molded plastic composite power connection unit (42) constructed for arrangement at said carrier element (56) by positive engagement.

4. The electric machine according to claim 1, additionally comprising a cap element (60) covering an area where said first end portions (422a-c) of said terminal conductors (421a-c) connect to said connection conductors (40a-c) at said stator (16), said cap element constructed to engage said carrier element (56) and said plastic shell (50) by positive engagement.

5. The electric machine according to claim 1, additionally comprising a contact element (52a-c) extending from said second end portion (423a-c) of said terminal conductor (421a-c); and a first terminal housing area (54a) connected to said plastic shell (50) and enclosing said contact element (52a-c).

6. The electric machine according to claim 5, comprising a free space formed between said contact element (52a-c) and said first terminal housing area (54a).

7. The electric machine according to claim 5, wherein said injection molded plastic composite power connection unit (42) comprises a second terminal housing area (54b) enclosing said first terminal housing area (54a) by positive engagement.

8. The electric machine according to claim 7, wherein said first and second terminal housing areas (54a, b) are secured jointly to a machine housing enclosing said stator (16).

9. The electric machine according to claim 1, wherein said injection molded plastic composite power connection unit (42) additionally comprises a signal connection area (64).

10. The electric machine according to claim 1, wherein said terminal conductors (421*a-c*) are secured to said connection conductors (40*a-c*) so as to be spaced apart in circumferential direction at said stator (16); and said contact elements (52*a-c*) arranged so as to be spaced apart axially at said stator (16).

\* \* \* \* \*